April 25, 1944.   D. McLACHLAN, JR   2,347,638
X-RAY TECHNIQUE
Filed Aug. 22, 1942   2 Sheets-Sheet 2
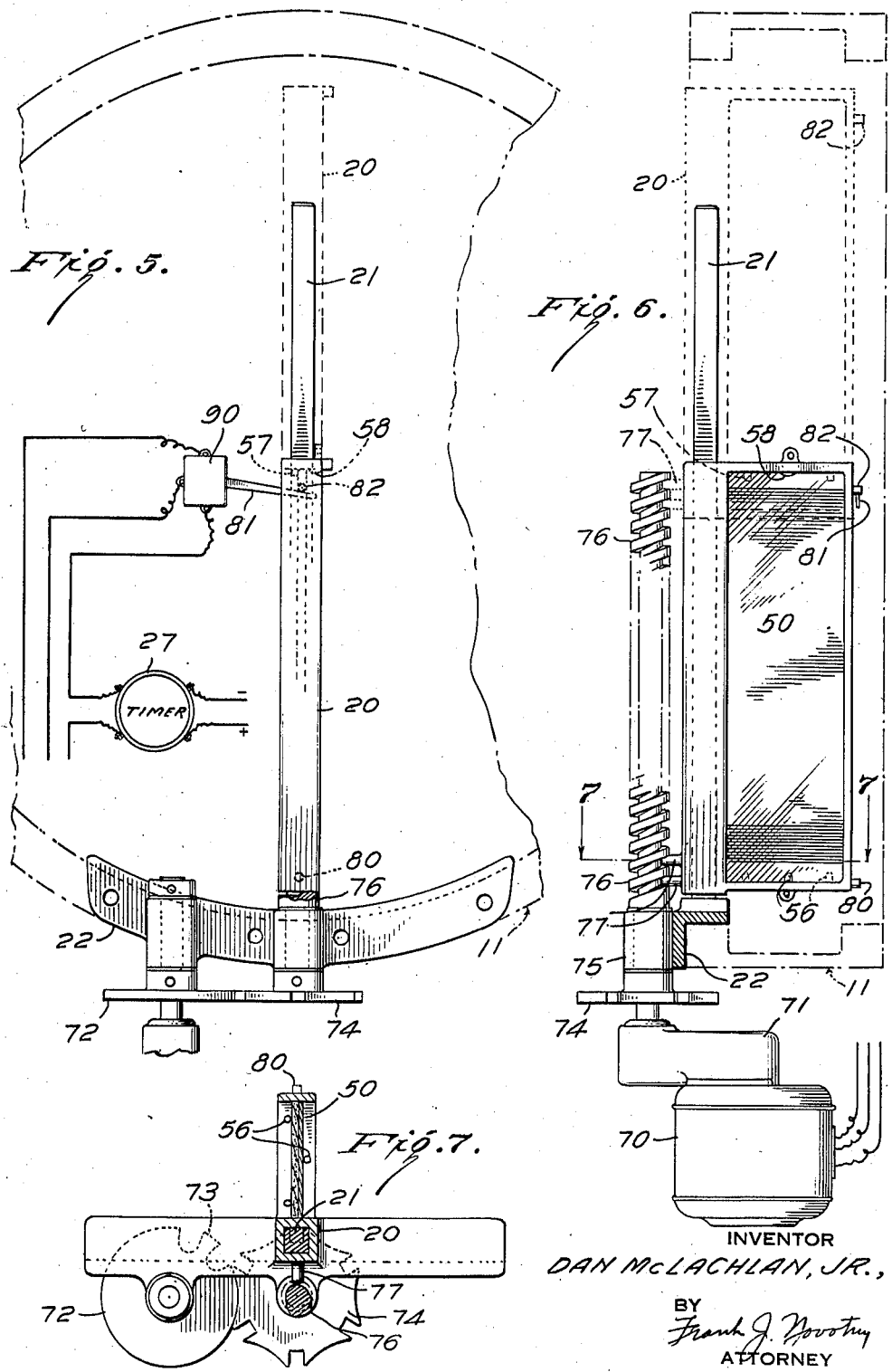
INVENTOR
DAN McLACHLAN, JR.,
BY
Frank J. Novotny
ATTORNEY Patented Apr. 25, 1944

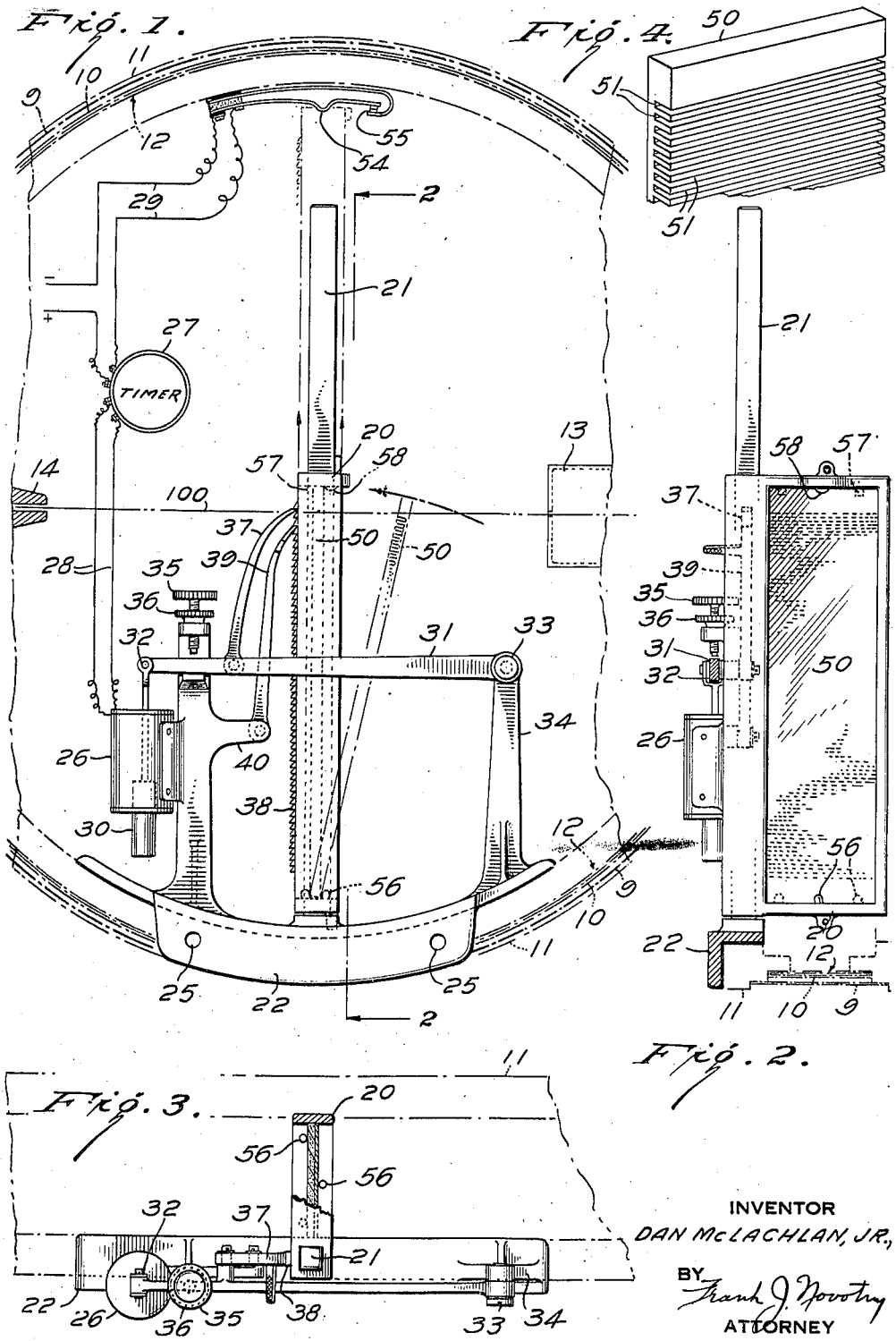

2,347,638

UNITED STATES PATENT OFFICE 2,347,638

X-RAY TECHNIQUE

Dan McLachlan, Jr., Old Greenwich, Conn., assignor to American Cyanamid Company, New York, N. Y., a corporation of Maine Application August 22, 1942, Serial No. 455,691

2 Claims. (Cl. 250—53)

This invention relates to an improved camera for use in the X-ray analysis of powdered materials, crystalline substances, and the like. More particularly, it embraces an auxiliary apparatus which when attached to a conventional X-ray camera set up for standard Hull-Debye-Scherrer powder analyses, is adapted to pass or reciprocate crystalline specimens intermittently through the path of the incident X-ray beam normally used in such a camera.

Heretofore, in order to obtain satisfactory X-ray photographs in accordance with the standard Hull-Debye-Scherrer techniquer of X-ray analysis for powdered materials, it was necessary to grind the material to 200 mesh or smaller. In use, such a camera includes an incident primary X-ray beam which passes through the powder specimen, is diffracted and falls upon a photographic film as a series of successive lines each uniformly intense throughout and each corresponding to one interplanar distance, familiar to those versed in X-ray technique.

However, some substances, and more particularly organic crystalline materials, do not lend themselves to such fine grinding as 200 mesh. For example, sulfanilamide when ground to approximately such size does not remain as a perfectly ordered crystalline material, but is distorted as a result of the grinding process. This results in the obtainment of X-ray photographs which are not replicas of those reproduced from the crystalline material in its unground or natural state. However, when such organic crystalline material is left in a relatively coarser crystalline state and its diffraction pattern obtained while held in a single capillary tube, a spotty photograph or one displaying discontinuous lines is usually obtained. This is due to the relatively small number of crystals lying in the scope of the beam. Such a photograph is not capable of yielding the necessary intensity and distance measurements with such accuracy as is now demanded in industrial and scientific research.

It is an object of this invention to render unnecessary the fine grinding, with its accompanying distortion, of crystalline materials for use in X-ray analysis while nevertheless facilitating the obtainment of powder diffraction patterns wherein the lines are fine, continuous and of even intensity throughout their length.

Another object of this invention is to provide means facilitating the obtainment of X-ray powder diffraction pictures having a minimum of background or darkening of an exposed film such as is caused when the incident X-rays are scattered by a conventional powder holder, i. e., a glass capillary tube.

Still another object is to provide a powder holder wherein the shape of the sample is well defined.

A further object is to provide auxiliary apparatus wherein step-by-step removal and insertion of specimens enables one to obtain X-ray diffraction photographs in a much shorter time interval than was heretofore possible.

Still other and further objects will become apparent upon reading the following description incorporating various embodiments of this invention. It is to be understood that the examples herein given in considerable detail are merely illustrative and not limitative of this invention.

In general this invention attains the above and other objects by providing apparatus wherein a plurality of capillary compartments or similarly elongated sample holders filled with a comminuted specimen are passed through the collimated X-ray beam of a Hull-Debye-Scherrer type of powder camera to obtain a series of superimposed X-ray pictures which are recorded on a single film in the form of continuous line spectra of even intensity throughout.

In order to facilitate a more complete understanding of the principles of this invention, a number of drawings forming a part of this disclosure are included herein and illustrate clearly a number of embodiments of the invention. The scope of the invention, however, is to be limited solely by the appended claims.

This invention is a further development of the subject matter disclosed in McLachlan's copending application, Serial No. 433,427, filed March 5, 1942, for "Improvement in X-ray technique." In the drawings:

Fig. 1 is a side view of one modification of the apparatus of this invention shown fitted to the quadrant cassette of a conventional type of Hull-Debye-Scherrer camera;

Fig. 2 is a front view of the apparatus of Fig. 1 taken on the line 2—2, a portion of the cylindrical cassette being broken away;

Fig. 3 is a top plan view of the apparatus of Fig. 1, a portion of the cylindrical cassette being broken away to show the structure more clearly;

Fig. 4 is a perspective view of a sample frame 50 having grooves 51 for carrying the crystal specimens;

Fig. 5 is a side view of another embodiment of apparatus according to this invention, being a side view thereof fitted to a conventional type of Hull-Debye-Scherrer camera;

Fig. 6 is a front view of the apparatus of Fig. 5 taken from the same point of view as Fig. 2; and Fig. 7 is a sectional view of the apparatus of Fig. 5 taken on the line 7—7 of Fig. 6.

In the figures, similar or corresponding elements or structures have been given the same numerical indicators in order to simplify the description.

Referring now in more detail to the drawings, the cylindrical cassette 11 has wrapped thereon a photographic film 12. This film is in the form of a narrow strip and hence is used to record a desired portion of the X-ray beam and its diffracted beam or beams, namely those falling on or within the cylindrical surface. Any laterally diffracted X-rays are lost and left unregistered. As shown more clearly in Fig. 2, the film packet consists preferably of three layers, namely an inner sheet of aluminum foil .001 inch thick to keep out ordinary light while admitting X-rays, the film 12 itself, and an outer fluorescent screen backing to render the film more sensitive. A spring brass collar 10 holds the film unit 12 in place on the cassette while cover ring 9 completes the assembly of the film on the cassette.

The collimeter 13 contains a slit system which is used to define the emerging X-rays in the form of a thin flat beam which strikes a sample cluster of crystals introduced into its path at the axis of the cassette. The zero or undiffracted beam enters the zero beam trap opening 14 while the diffracted beams strike the film where they are recorded. A removable plug may be inserted in the zero beam trap opening in order to block out the position of the zero beam from the film. Momentarily removing the plug during an exposure is sufficient to record the position of the zero beam on the film.

The novel features of the particular embodiment of the apparatus illustrated in Figs. 1 to 4 inclusive comprise the reciprocating sample mount 20 which in the particular embodiment shown is capable of being moved step-by-step upward on the square guide rod 21. Guide rod 21 is affixed to auxiliary frame 22 which is rigidly affixed to the cassette 11 by screws 25. The electromagnet 26 is periodically energized through a timer 27 and its associated circuits 28 and 29, the timer 27 being set so as to energize electromagnet 26 periodically over intervals of 2, 3 or more minutes, thereby to attract the solenoidal armature 30. The raising of armature 30 causes lever 31 affixed to armature 30 by pivot pin 32 to be lifted and rotated about pivot pin 33 at which point lever 31 is fulcrumed on stationary lug 34, the latter forming a part of auxiliary frame 22. The extent of movement of lever 31 is governed by the thumb screw 35 and lock nut 36. Lever 31 in its intermittent movement activates or lifts pawl 37 which engages a tooth on ratchet 38 which in turn is rigidly affixed to sample mount 20, causing the latter to be lifted one or more units or tooth heights depending upon the setting of thumb screw 35 and lock nut 36. 39 is a holding pawl, pivoted on stationary lug 40, and adapted to maintain or support the sample mount in each of its consecutively raised positions. Preferably, the distance between the teeth on ratchet 38 and the relative freedom of the lifting lever 31 are so arranged that the incident X-ray beam 100 is caused to coincide with and pass through the thin portion of the sample frame 50, i. e., more particularly, the sample frame 50 is so constructed that the X-ray beam is automatically intercepted and in line with the grooves 51 carrying the impacted crystal specimens. Thus each groove 51 is sequentially exposed to the collimated X-ray beam for a definite time interval, depending on the setting of the timer 27.

At the completion of one step-by-step exposure of the crystal specimens in the sample frame 50 the sample mount 20 abuts against springswitch 54 breaking contacts 55 and opening the circuit 29 to the timer 27 thereby shutting down the system, as by de-energizing the electromagnet circuit 28, as well as the auxiliary X-ray tube circuits by means well-known to those versed in the related art.

Sample frame 50 in which the crystal specimens are held as in grooves 51 is adapted for relatively facile insertion in the reciprocating sample mount 20 by orientation between pins 56 at the bottom and 57 at the top, a depressible spring tensioned ball-bearing 58 serving to hold sample frame 50 in place. The dotted line and curved arrow of Fig. 1 show the method of insertion of sample frame 50.

The alternative embodiment shown in Figs. 5 to 7 inclusive illustrates a further modified apparatus whereby the sample frame 50 may be reciprocated step-by-step through the incident X-ray beam (not shown). This apparatus differs from the electromagnetic step-by-step actuated lever and pawl arrangement shown in the prior Figs. 1 to 4 inclusive.

In Figs. 5 to 7 inclusive, corresponding numbers found in the previous figures indicate similar elements. Thus cassette 11 has a photographic film 12 positioned thereon. A reciprocation of the sample mount 20 is effected in this embodiment of the invention by means of a reversible motor 70 operating through reduction gearing 71 to turn toothed wheel 72 at the rate of, for example, 1 revolution per 10 minute interval. This results in tooth 73 engaging and intermittently turning grooved wheel 74, through one-sixth of a revolution for each revolution of toothed wheel 72. Grooved wheel 74 is affixed to shaft 75 journalled in auxiliary frame 22. Shaft 75 at its upper end has a spiral thread 76 cut therein, this spiral thread being adapted for engagement with lugs 77 affixed to sample mount 20. Thus the intermittent turning of grooved wheel 74 causes the sample mount to be raised a predetermined distance, preferably a distance effective to cause the incident X-ray beam to coincide with and pass through the thin portion of the sample frame 50 so that the X-ray beam at each step lines up with the grooves 51 carrying the impacted crystal specimens. Thus each groove 51 is exposed to the incident X-rays sequentially for a predetermined time interval.

A positive contact break-and-make snap switch such as any one of a number of the commercially available single-pole, double-throw, snap-action switches is provided as indicated at 90 to reverse the driving motor 70. Thus when the sample mount 20 is caused to rise step-by-step to the position indicated by the broken lines in Fig. 5, a lug 80 trips lever 81 causing the positively breaking-and-making snap switch 90 to break one circuit and complete an alternative circuit for reversibly energizing motor 70 and thereby causing sample mount 20 to return to its original position as shown in Fig. 5, whereupon lug 82 throws trip lever 81 to the position shown to again reverse the direction of rotation of motor 70 causing the sample mount 20 to intermittently ascend to the position indicated by the broken lines. This reciprocating intermittent motion continues until the timer 27 breaks the circuit to de-energize motor 70 and simultaneously shut down the X-ray tube circuit as above described in the discussion of Figs. 1 to 4 inclusive.

The sample holder may take any one of a number of shapes and may be made up of any one of a number of non-crystalline materials such as resins, glass, and the like, each being adapted to hold either on its surface or in grooves cut therein a predetermined quantity of the crystalline material or clusters of the crystalline material in the form of elongated samples of relatively coarse crystalline powder. With this apparatus the samples are ordinarily placed into and removed from the path of the flat incident beam of X-rays and as a result clear-cut continuous line spectra of even intensity throughout are obtained.

Numerous other devices for moving the crystalline samples across the path of the incident X-ray beam of a Hull-Debye-Scherrer camera will, of course, readily suggest themselves to those skilled in the art upon reading the above disclosure. Thus, a revolving disc having grooves cut radially in its surface or any similarly step-by-step moving sample mount may be used to cause a great number of crystal samples to pass through the path of the incident X-ray beam. Such apparatus and similar and equivalent apparatus is intended to be encompassed within the scope of the appended claims.

I claim:

1. An X-ray apparatus for obtaining powder diffraction patterns comprising an incident X-ray beam, a sample mount for carrying comminuted crystalline material, means for reciprocating the sample mount in a plurality of discrete intermittent steps through the incident X-ray beam and means for recording the diffracted incident beam after its passage through the crystalline material.

2. The method of obtaining powder diffraction patterns which comprises causing a plurality of crystals to reciprocate in a plurality of discrete intermittent steps through the path of an incident X-ray beam and recording the diffracted rays after their passage through the crystals.

DAN McLACHLAN, Jr.